United States Patent [19]

Brogardh et al.

[11] Patent Number: 4,473,747

[45] Date of Patent: Sep. 25, 1984

[54] SEMICONDUCTOR STRUCTURE FOR A FIBER OPTICAL PRESSURE SENSING ELEMENT

[75] Inventors: Torgny Brogårdh; Christer Ovrén, both of Västerås, Sweden

[73] Assignee: ASEA AB, Västerås, Sweden

[21] Appl. No.: 318,021

[22] Filed: Nov. 4, 1981

[30] Foreign Application Priority Data

Nov. 6, 1980 [SE] Sweden .................. 8007805

[51] Int. Cl.³ .................................. H01L 33/00
[52] U.S. Cl. .............................. 250/231 R; 357/17
[58] Field of Search .......... 250/211 J, 211 R, 231 R; 357/30, 52, 17, 26

[56] References Cited

U.S. PATENT DOCUMENTS 4,273,594  6/1981  Heller et al. .............. 357/52 X
4,376,890  3/1983  Engstrom et al. .......... 250/231 R X
4,378,496  3/1983  Brogardh et al. .......... 250/231 R X
4,388,633  6/1983  Vasudev ..................... 357/17

Primary Examiner—David C. Nelms
Assistant Examiner—Edward P. Westin
Attorney, Agent, or Firm—Watson, Cole, Grindle & Watson

[57] ABSTRACT

The present invention relates to an optical sensor element of a solid material for sensing physical quantities such as pressure, which element is excitable to emit photoluminescence on excitation which constitutes a measure of the quantity being sensed. The sensor element comprises a diaphragm which consists of at least two layers applied to an apertured substrate, at least one of which layers has luminescent properties. The luminescence may be sensed by means of at least one optical fiber.

10 Claims, 8 Drawing Figures

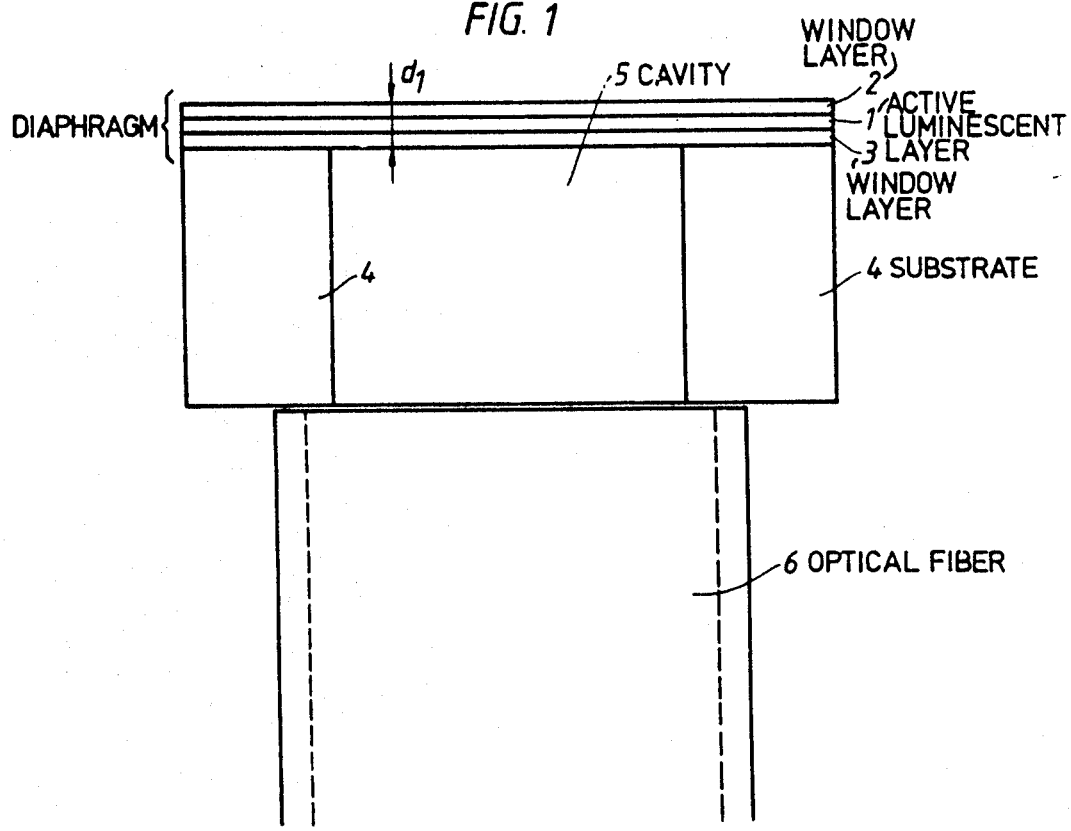
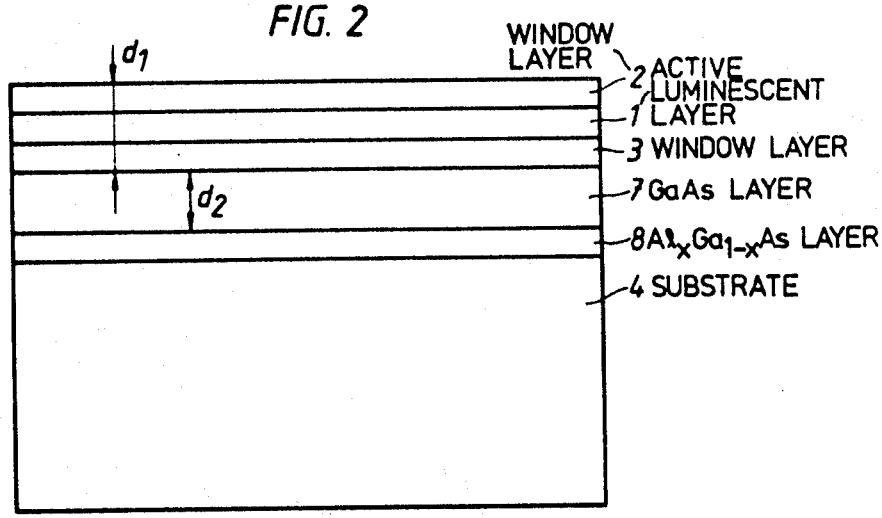

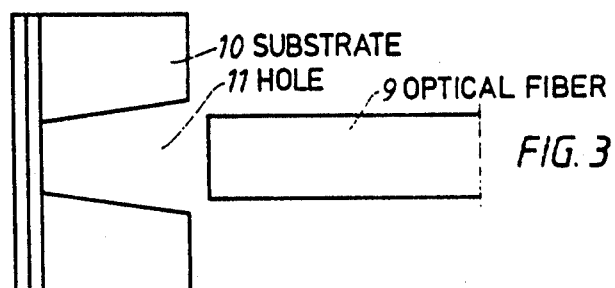
FIG. 3
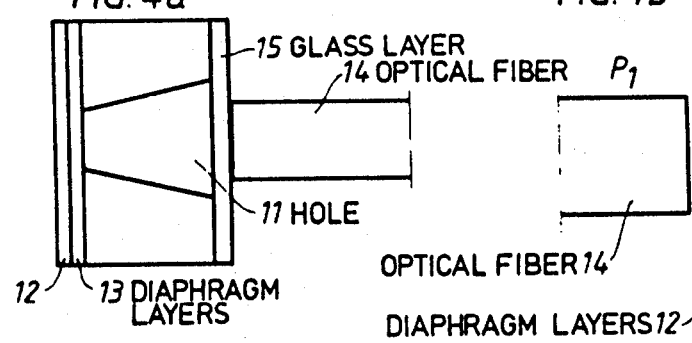
FIG. 4a FIG. 4b
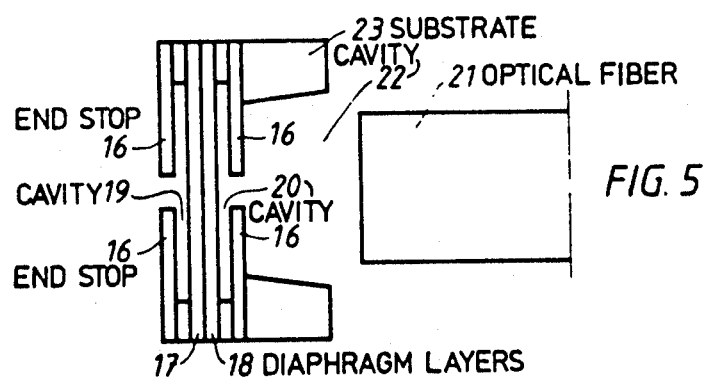
FIG. 5
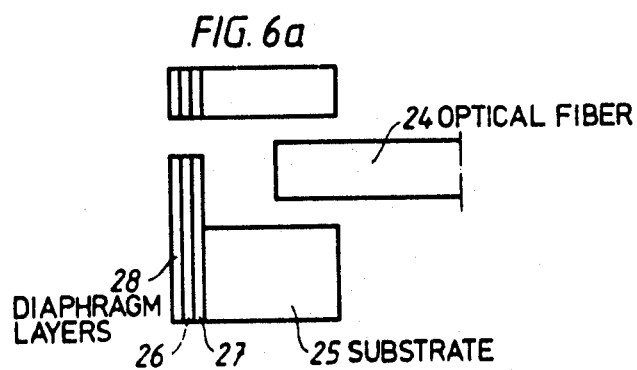 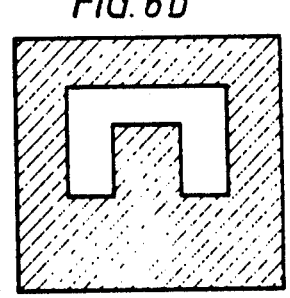
FIG. 6a FIG. 6b

SEMICONDUCTOR STRUCTURE FOR A FIBER OPTICAL PRESSURE SENSING ELEMENT

TECHNICAL FIELD

The present invention relates to an optical sensor element of a solid material for sensing a physical parameter, such as pressure, which element is excitable to emit photoluminescence on excitation, a property of the photo-luminescence constituting a measure of the parameter being sensed.

DISCUSSION OF PRIOR ART

A fiber optical measuring apparatus has been previously proposed in which force- or pressure-induced changes in the luminescence spectrum of a solid material are utilized for measuring purposes. U.S. patent application Ser. No. 226,829, filed on Jan. 21, 1981, now abandoned, in the names of Torgny Brogårdh, Olov Engström and Christer Ovrte,acu/e/ n assigned to ASEA Aktiebolag, relates to such an optical measuring apparatus and comprises at least one source of incident light, at least one optical fiber for conducting light to and from a sensor, and a detector system for processing the light emitted by the sensor. The sensor consists of a material haaving pressure- or force-dependent photoluminescent properties, whereby the output signal from the detector system becomes dependent on the pressure or the force.

Semiconductor structures comprising three or more epitactically grown layers of GaAs and $Al_xGa_{1-x}As$ applied on a substrate have been proposed for the sensors in such apparatus. In this prior proposal the optical sensor element is employed for sensing physical parameters such as temperature and pressure, for example, and the sensor element is optically excited and emits photoluminescence which is a measure of the parameter being sensed. In this prior proposal, the luminescent material included in the sensor is surrounded by a material having low absorption for both the incident and luminescent light. Using a sensor element constructed in this manner gives rise to a number of advantages which are described in detail in the above-mentioned U.S. patent application.

The physical effect which is utilized in the abovementioned measuring apparatus is a change in the band gap of the luminescent material, due to a change in the pressure applied to the sensor. However, the pressure-induced band gap change is relatively small, (e.g. $d\epsilon_G/dP = 16 \cdot 10^{-6}$ ev/kg.cm² for GaAs at room temperature), and relatively large changes in hydrostatic pressures are required to obtain a significant change in signal level.

Mechanical (uniaxial) forces can be measured more easily, since they can be applied to a relatively small surface area of the sensor, but this involves a risk that the surface of the sensor is damaged, which may result in a reduction of the luminescent signal.

DISCLOSURE OF INVENTION

One object of the invention is to provide a solution to the above-mentioned problems and other problems associated therewith. The invention is characterised in that the luminescent material included in the sensor is in the form of diaphragm which consists of at least two layers, applied on an apertured substrate, at least one of which layers is luminescent. The luminescence is preferably arranged to be sensed by means of at least one optical fiber. In a preferred embodiment, as least two layers on the apertured substrate are luminescent but luminesce with mutually different spectra.

BRIEF DESCRIPTION OF DRAWINGS

The invention will be further described, by way of example, with reference to the accompanying drawings, in which:

FIG. 1 shows schematically a first embodiment of a sensor according to the invention, FIG. 2 shows schematically a second embodiment of a sensor according to the invention, FIG. 3 shows schematically a sensor in which the substrate is provided with a hole therein and with a diaphragm having two semiconductor layers, FIG. 4a shows how a sensor according to the invention can be used for measurement of absolute pressure, FIG. 4b shows how a sensor according to the invention can be used for measurement of pressure difference.

FIG. 5 shows an embodiment with end stops for the diaphragm,

FIG. 6a shows an additional sensor structure seen from the side, and

FIG. 6b shows the sensor of FIG. 6a seen from the front.

DESCRIPTION OF PREFERRED EMBODIMENTS

FIG. 1 shows a sensor consisting of a substrate 4 with three epitactic layers. The numeral 1 designates an "active" luminescent layer of GaAs, which is surrounded by "windows" 2 and 3 of $Al_xGa_{1-x}As$, for obtaining the desired luminescent properties for the sensor. The material employed for the windows 2 and 3 should have low absorption at the wavelengths of the incident (or excitation) and luminescent light, and it should be chosen with a lattice constant which coincides as closely as possible with the lattice constant of the active layer 1. By etching away material from the substrate 4, a cavity 5 is formed in the sensor which is limited at one end by a thin diaphragm formed from the layers 1-3. The opening to the cavity 5 is sealed in some suitable manner, for example by being mounted directly on an end of an optical fiber 6 with a diameter of $D_{FIBER} \gtrsim D_{HOLE}$. A plate of a transparent material (not shown) may be located between the fiber and the substrate 4.

When the sensor shown in FIG. 1 is subjected to a hydrostatic pressure, a deflection of the diaphragm 1-3 occurs so that mechanical stresses are generated therein. These stresses cause a change of the spectrum of the luminescent light emitted by the active layer 1, on its excitation, and the changes can be detected in a conventional manner (e.g. in the manner described in the aforementioned U.S. patent application). The advantage of the sensor shown in FIG. 1, compared with the previously proposed sensors, is that the sensitivity is determined by the choice of the crosssectional area of the cavity 5 and the thickness $d_1$ of the diaphragm 1-3 and therefore can be made considerably higher. The substrate 4 may be easily etched away by a known selective etching method where the rate of etching differs considerably between GaAs and $Al_xGa_{1-x}As$. Thus, the thickness $d_1$ is determined during the growth of the layers and may vary between about 0.3 and 300 μm. Such selective etching methods have been developed, inter alia, for the manufacture of special light-emitting diodes.

A structure in which a high sensitivity is combined with good resistance to pressure impacts can be achieved with the epitactic layers shown in FIG. 2 as a starting-point. During the subsequent processing, the entire GaAs substrate 4 is first etched away, after the shown structure has been attached, for example, to a glass plate applied to the layer 2. After this, the $Al_xGa_{1-x}As$ layer 8, nearest the substrate 4, is etched away completely, and finally a hole is etched in the GaAs layer 7. By using this production method, the distance $d_2$ may be made very small (which is determined during growth of the composite structure), and therefore the deflection of the diaphragm 1-3 upon pressure impacts can be restricted.

A sensor as shown in FIG. 1 (or as produced from the structure shown in FIG. 2) may, of course, be used for force measurement, for example, by locating it in a filled space, the volume of which can be influenced externally by the force to be measured.

The active luminescent layer 1 in both the embodiments discussed above is surrounded by a material having low absorption for the excitation and luminescent light. Between the luminescent layer 1 and one of the surrounding layers 2 or 3, there may be arranged one or more further layers with less doping and/or smaller thickness than the luminescent layer, which results in the advantages obtained with the previously proposed design, namely, that the material which surrounds the active layer is chosen with a lattice constant which coincides as closely as possible with the lattice constant of the active layer, thus limiting recombinations at the boundary surfaces between different materials.

FIG. 3 shows an end of a fiber 9 adjacent to a hole 11 formed in a substrate 10. The hole 11 is etched or otherwise produced in the substrate 10. The semiconductor layers on the substrate 10 form a diaphragm consisting of at least the two layers 12, 13 shown. The layer 12 is a luminescent layer. Possibly, both layers 12 and 13 may be luminescent but have different spectra of luminescence. In the simplest embodiment, the diaphragm may consist of only one active layer.

The luminescence may be photo-luminescence, which is obtained by excitation of the luminescent layer 12 with incident light. However, the luminescence may also be obtained in the form of electro-luminescence, where two of the semiconductor layers form a PN junction. The semiconductor materials and the substrate may suitably consist of $Al_xGa_{1-x}As$.

A sensor according to the invention may be used for measuring absolute pressure in the manner shown in FIG. 4a, in which a glass layer 15 is applied between a fiber 14 and the sensor. This glass layer will then form a closed volume of air inside the enclosed cavity 11. The pressure to be measured may, for example, be applied to the diaphragm formed by the layers 12 and 13.

FIG. 4b shows how a sensor according to the invention can be used to measure a pressure difference between a pressure $P_1$ existing on the side of the diaphragm 12, 13 on which a fiber 14 is located and a pressure $P_2$ on the other side of the diaphragm. The relative pressure or the pressure difference $P_1-P_2$ is sensed by the diaphragm.

FIG. 5 shows a sensor provided with end stops 16 for the diaphragm (here defined by the layers 17, 18). Between each end stop 16 and the diaphragm 17, 18 there are arranged respective cavities 19 and 20. A fiber 21 terminates adjacent to a cavity 22 formed in the substrate 23 of the sensor. In the embodiment of sensor shown in FIG. 5 the cavities 19, 20 and 22 are again formed by selective etching.

FIGS. 6a and 6b show a section and plan of a further embodiment of sensor according to the invention which can be used for measuring vibration, elongation, or force. FIG. 6a shows the sensor from the side. The numeral 24 designates a fiber terminating in a cavity in a substrate 25, to which a three layer diaphragm 26, 27, 28 has been applied. The diaphragm 26, 27, 28 is etched to acquire the shape shown in FIG. 6b.

The constructions illustrated may be varied in many ways within the scope of the following claims.

What is claimed is:

1. An optical sensor element formed of semiconductor material for sensing a physical parameter, comprising:
    a substrate having a cavity formed therein; and
    a diaphragm member overlying an opening of said cavity and being formed of at least two semiconductor layers, at least one of said semiconductor layers having luminescence properties, said at least one semiconductor layer being adapted to emit luminescence characterized by said luminescence properties with said diaphragm member being deflected by said physical parameter causing a change in the spectrum of the emitted luminescence and said at least one semiconductor layer being exposed to incident light; and
    an optical fiber having an end terminating adjacent said cavity.

2. An optical sensor according to claim 1 wherein said luminescence is in the form of photoluminescence obtained by exposure of said at least one semiconductor layer to incident light.

3. An optical sensor according to claim 2, in which the end of the said optical fiber is located adjacent to the diaphragm and said physical parameter to be measured is the difference between pressures applied to different areas of said diaphragm.

4. An optical sensor according to claim 1, in which said diaphragm is formed of at least three semiconductor layers, said at least one semiconductor layer adapted to emit luminescence is contacted on at least one side by a non-luminescent semiconductor layer having a lattice constant close to that of said at least one luminescence emitting semiconductor layer for minimizing non-radiating recombinations at the boundary surfaces between the luminescent and non-luminescent semiconductor layers.

5. An optical sensor according to claim 4, in which said diaphragm is formed of a luminescent layer surrounded on both sides by a material having low absorption for both excitation and luminescent light and between the luminescent layer and one of the surrounding layers there is arranged an additional layer having less doping than the luminescent layer.

6. A optical sensor element as claimed in claim 5, in which said additional layer is of smaller thickness than the luminescent layer.

7. An optical sensor according to claim 1 further comprising a first pair of end stop members parallelly spaced from said diaphragm with each of said end stops being oppositely disposed with respect to one another and forming a second cavity adjacent one side of said diaphragm, a second pair of end stop members parallelly spaced from said diaphragm with each of said end stop members being oppositely disposed with respect to one another and forming a third cavity adjacent the opposite side of said one side of said diaphragm, and said fiber optic end being adjacent said cavity and said second cavity.

8. An optical sensor element according to claim 1 in which the luminescence of said at least two layers is obtained in the form of electro-luminescence where two adjacent semiconductor layers form a PN junction.

9. An optical sensor according to claim 1 in which the diaphragm and the substrate both consist of AlGaAs.

10. An optical sensor element according to claim 1 in which said physical parameter being sensed is pressure, further comprising a glass layer disposed between a remaining opening in said substrate, said glass layer sealing a closed volume of gas in said cavity. EE

* * * * *